(12) United States Patent
Stevens et al.

(10) Patent No.: US 9,881,481 B2
(45) Date of Patent: *Jan. 30, 2018

(54) MOBILE DEVICE LOSS PREVENTION

(71) Applicant: INTERNATIONAL BUSINESS MACHINES CORPORATION, Armonk, NY (US)

(72) Inventors: Mark B. Stevens, Austin, TX (US); John D. Wilson, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,875

(22) Filed: Sep. 15, 2014

(65) Prior Publication Data

US 2015/0179046 A1   Jun. 25, 2015

Related U.S. Application Data

(63) Continuation of application No. 14/136,369, filed on Dec. 20, 2013.

(51) Int. Cl.
  *G08B 1/08* (2006.01)
  *G08B 21/24* (2006.01)
  (Continued)

(52) U.S. Cl.
  CPC .......... *G08B 21/24* (2013.01); *G08B 21/182* (2013.01); *H04W 4/028* (2013.01)

(58) Field of Classification Search
  CPC ...... G08B 21/24; G08B 21/182; H04W 4/028
  (Continued)

(56) References Cited

U.S. PATENT DOCUMENTS 6,321,158 B1 * 11/2001 DeLorme ............... G01C 21/26
                                                                340/995.16
6,662,023 B1    12/2003 Helle
(Continued)

FOREIGN PATENT DOCUMENTS

EP    2053573 A1    4/2009
WO    2007069263 A2    6/2007
WO    2010099376 A2    9/2010

OTHER PUBLICATIONS

Lee, Tyler, "Tile Bluetooth Dongle Will Help You Locate Missing Object With the Help of Others", Jun. 27, 2013, found on the world wide web at: http://www.ubergizmo.com/2013/06/tile-bluetooth-dongle-will-help-you-locate-missing-object-with-the-help-of-others/.

(Continued)

*Primary Examiner* — Zhen Y Wu
(74) *Attorney, Agent, or Firm* — Paul S. Drake

(57) ABSTRACT

A method for a mobile device to prevent loss including monitoring environmental parameters by a mobile device; storing the environmental parameters in the mobile device to form a history of the environmental parameters; applying statistical analysis to a current set of environmental parameters as compared to the history of the environmental parameters to determine a probability that the mobile device is lost; and responsive to determining the probability that the mobile device is lost exceeds a threshold, performing an action to prevent loss of the mobile device.

13 Claims, 6 Drawing Sheets

(51) Int. Cl.
*G08B 21/18* (2006.01)
*H04W 4/02* (2009.01)

(58) Field of Classification Search
USPC .................................................. 340/539.13
See application file for complete search history.

(56) References Cited

U.S. PATENT DOCUMENTS

| | | | | |
|---|---|---|---|---|
| 7,898,414 | B2* | 3/2011 | Spano | G08B 21/24 |
| | | | | 340/539.13 |
| 7,973,655 | B2* | 7/2011 | Blinnikka | G08B 13/1427 |
| | | | | 340/539.13 |
| 8,402,134 | B1 | 3/2013 | Hir | |
| 8,483,659 | B2 | 7/2013 | Mahajan | |
| 8,493,213 | B2 | 7/2013 | Holley et al. | |
| 8,509,212 | B2* | 8/2013 | Sanjeev | H04W 4/028 |
| | | | | 340/539.13 |
| 8,911,507 | B1* | 12/2014 | Gilbert | H04W 4/028 |
| | | | | 455/410 |
| 2004/0150715 | A1* | 8/2004 | Wilcock | G06Q 30/02 |
| | | | | 348/143 |
| 2004/0166880 | A1* | 8/2004 | Horikami | B60L 3/0038 |
| | | | | 455/456.1 |
| 2005/0250518 | A1* | 11/2005 | Ishikawa | H04W 8/245 |
| | | | | 455/456.4 |
| 2008/0214111 | A1 | 9/2008 | Moshir et al. | |
| 2010/0173615 | A1 | 7/2010 | Harris | |
| 2010/0315236 | A1 | 12/2010 | Sakargayan | |
| 2011/0021174 | A1 | 1/2011 | Azimi et al. | |
| 2011/0145221 | A1* | 6/2011 | Kim | G06F 17/30463 |
| | | | | 707/718 |
| 2012/0258701 | A1 | 10/2012 | Walker et al. | |
| 2012/0258728 | A1 | 10/2012 | Seal et al. | |
| 2013/0023286 | A1* | 1/2013 | Soma | H04W 4/02 |
| | | | | 455/456.1 |
| 2013/0057392 | A1* | 3/2013 | Bullock | G06K 7/10029 |
| | | | | 340/10.5 |
| 2013/0165148 | A1 | 6/2013 | Bahl et al. | |
| 2013/0286238 | A1* | 10/2013 | Tan | H04N 5/23206 |
| | | | | 348/222.1 |
| 2013/0331121 | A1* | 12/2013 | Bandyopadhyay | H04W 64/00 |
| | | | | 455/456.1 |
| 2014/0089243 | A1* | 3/2014 | Oppenheimer | G06F 21/50 |
| | | | | 706/46 |
| 2014/0195927 | A1* | 7/2014 | DeWeese | H04L 63/10 |
| | | | | 715/750 |
| 2014/0266698 | A1* | 9/2014 | Hall | H04W 4/021 |
| | | | | 340/539.13 |
| 2014/0292998 | A1* | 10/2014 | Toga | H04M 1/72569 |
| | | | | 348/14.02 |
| 2015/0019126 | A1* | 1/2015 | Kozloski | G01C 21/3415 |
| | | | | 701/412 |
| 2015/0082371 | A1* | 3/2015 | DeWeese | H04L 63/10 |
| | | | | 726/1 |

OTHER PUBLICATIONS

"The Wireless Leash Plus with the myZOMM app for iPhone", 2012, found on the world wide web at: http://www.zomm.com/.
Condliffe, Jamie, "Nokia to Bring Out a New Bluetooth Tag to Track Your Stuff", Jul. 29, 2013, found on the world wide web at: http://theunhivedmind.com/wordpress3/2013/07/31/nokia-to-bring-out-a-new-bluetooth-tag-to-track-your-stuff/.
"System and Method of Finding a Lost/Stolen Mobile Device Which Is Not Accessible by the Owner", IPCOM000223683D, Nov. 23, 2012, found on the world wide web at: http://ip.com/IPCOM/000223683.
"Find My iPhone", Wikipedia.com, Dec. 15, 2012, found on the world wide web at: http://en.wikipedia.org/w/index.php?title=Find_My_iPhone&oldid=528128591.

* cited by examiner

FIG. 6A

| Timestamp | Location Parameters | Ambient Parameters | Operational Functionality Parameters | Derivative Parameters | Other Parameters | Lost Flag |
|---|---|---|---|---|---|---|
| 601 | 602 | 603 | 604 | 605 | 606 | 607 |

| User Info | Auth. Person Info | Location Info. | Other Device Info | Lost Prob. Weighting | Prob. Reduction Parameters | Threshold Probability | First Actions | Second Actions |
|---|---|---|---|---|---|---|---|---|
| 621 | 622 | 623 | 624 | 625 | 626 | 627 | 628 | 629 |

| Sample Parameter Description | Sample Parameter Distribution Type | Sample Parameter Average | Sample Parameter Standard Deviation | Sample Parameter Number |
|---|---|---|---|---|
| 641 | 642 | 643 | 644 | 645 |

640

| Correlation Type | Correlation Distribution | Correlation Average | Correlation Standard Deviation | Correlation Number |
|---|---|---|---|---|
| 661 | 662 | 663 | 664 | 665 |

660

MOBILE DEVICE LOSS PREVENTION

This application is a continuation of application Ser. No. 14/136,369 filed Dec. 20, 2013 entitled "MOBILE DEVICE LOSS PREVENTION", the disclosure of which is incorporated in its entirety herein by reference.

BACKGROUND

1. Technical Field

The present invention relates generally to a mobile device preventing loss, and in particular, to a computer implemented method for the mobile device to predict the mobile device is lost based on environmental parameters and then taking actions to alert the user.

2. Description of Related Art

Mobile devices are becoming more capable of performing complex tasks for users across the world. Today many people rely on mobile devices for a variety of purposes including communications, mobile processing capabilities, information retention and retrieval, gaming, etc. As the capabilities of these mobile devices increase and miniaturization improves, such mobile devices are becoming more integrated into our personal and work lives.

Mobile devices are by their very nature easy to be forgotten, misplaced, stolen, or otherwise lost. Such a loss includes the monetary value of the mobile device, the inconvenience of the loss, any improper monetary charges which may be incurred by an unauthorized person on the lost device, as well as a potential loss of security for any data contained in or accessible by the mobile device. As a result, people have become more careful to avoid losing their mobile devices.

SUMMARY

The illustrative embodiments provide a method for a mobile device to prevent loss including monitoring environmental parameters by a mobile device; storing the environmental parameters in the mobile device to form a history of the environmental parameters; applying statistical analysis to a current set of environmental parameters as compared to the history of the environmental parameters to determine a probability that the mobile device is lost; and responsive to determining the probability that the mobile device is lost exceeds a threshold, performing an action to prevent loss of the mobile device.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 6A through 6C are block diagrams of types of database records in which various embodiments may be implemented.

DETAILED DESCRIPTION

Processes and devices may be implemented and utilized for preventing loss of a mobile device. In these implementations, a mobile device loss prevention system within the mobile device predicts whether the mobile device is lost and then takes certain actions in response to the lost prediction. These actions should alert the user or an authorized person of the lost prediction. The user or authorized person can then take steps to recover the lost mobile device, thereby preventing loss of the mobile device. These processes and apparatuses may be implemented and utilized as will be explained with reference to the various embodiments below.

Figure 1:
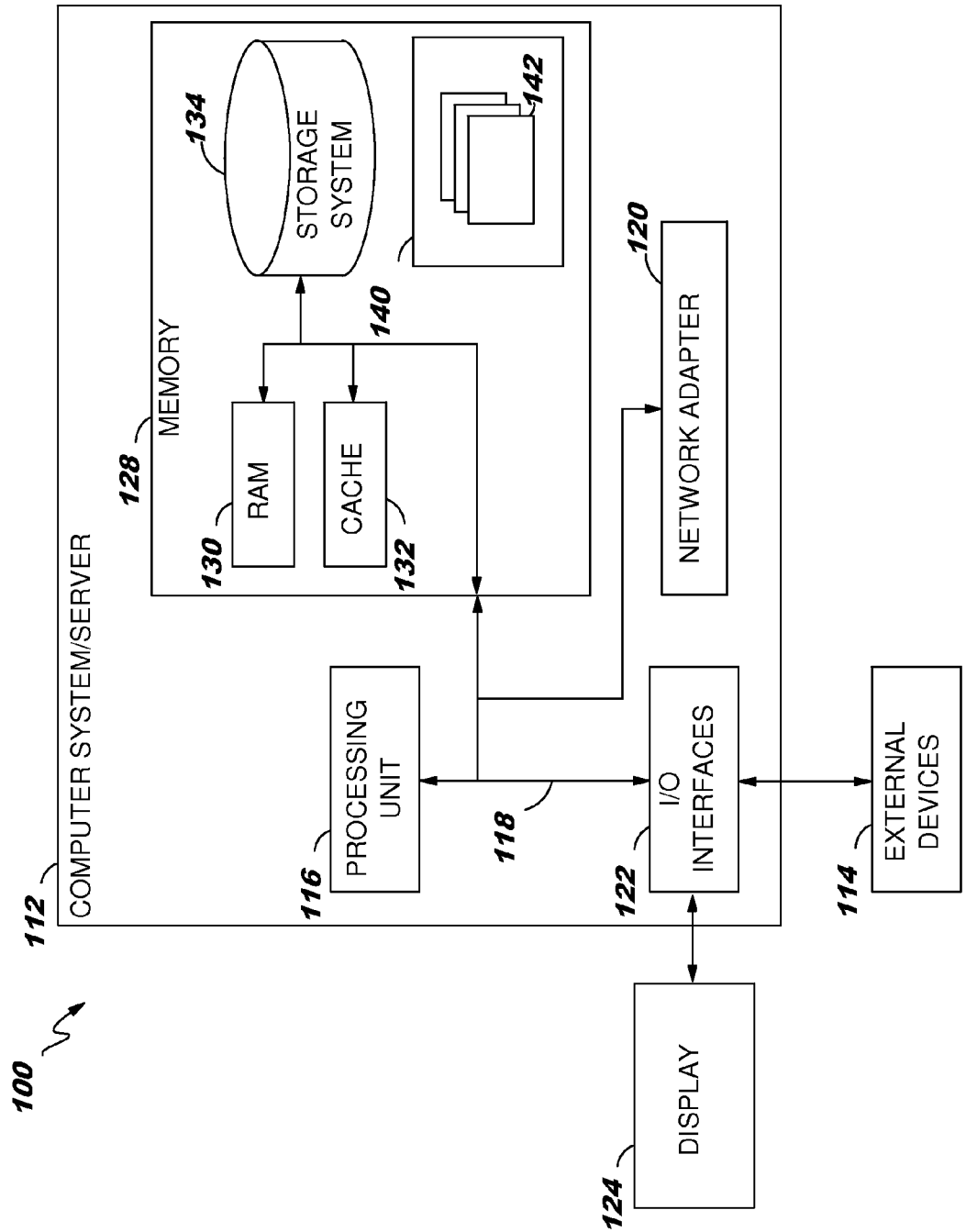
FIG. 1 is a block diagram of an illustrative data processing system in which various embodiments of the present disclosure may be implemented.

FIG. 1 is a block diagram of an illustrative data processing system in which various embodiments of the present disclosure may be implemented. Data processing system 100 is one example of a suitable data processing system and is not intended to suggest any limitation as to the scope of use or functionality of the embodiments described herein. Regardless, data processing system 100 is capable of being implemented and/or performing any of the functionality set forth herein such as preventing loss of a mobile device.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of non-transitory computer system usable media. Such media may be any available media that is accessible by computer system/server 112, and it includes both volatile and non-volatile media, removable and non-removable media.

System memory 128 can include non-transitory computer system usable media in the form of volatile memory, such as random access memory (RAM) 130 and/or cache memory 132. Computer system/server 112 may further include other non-transitory removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of the embodiments. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of the embodiments. For example, a program module may be software for preventing loss of a mobile device.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
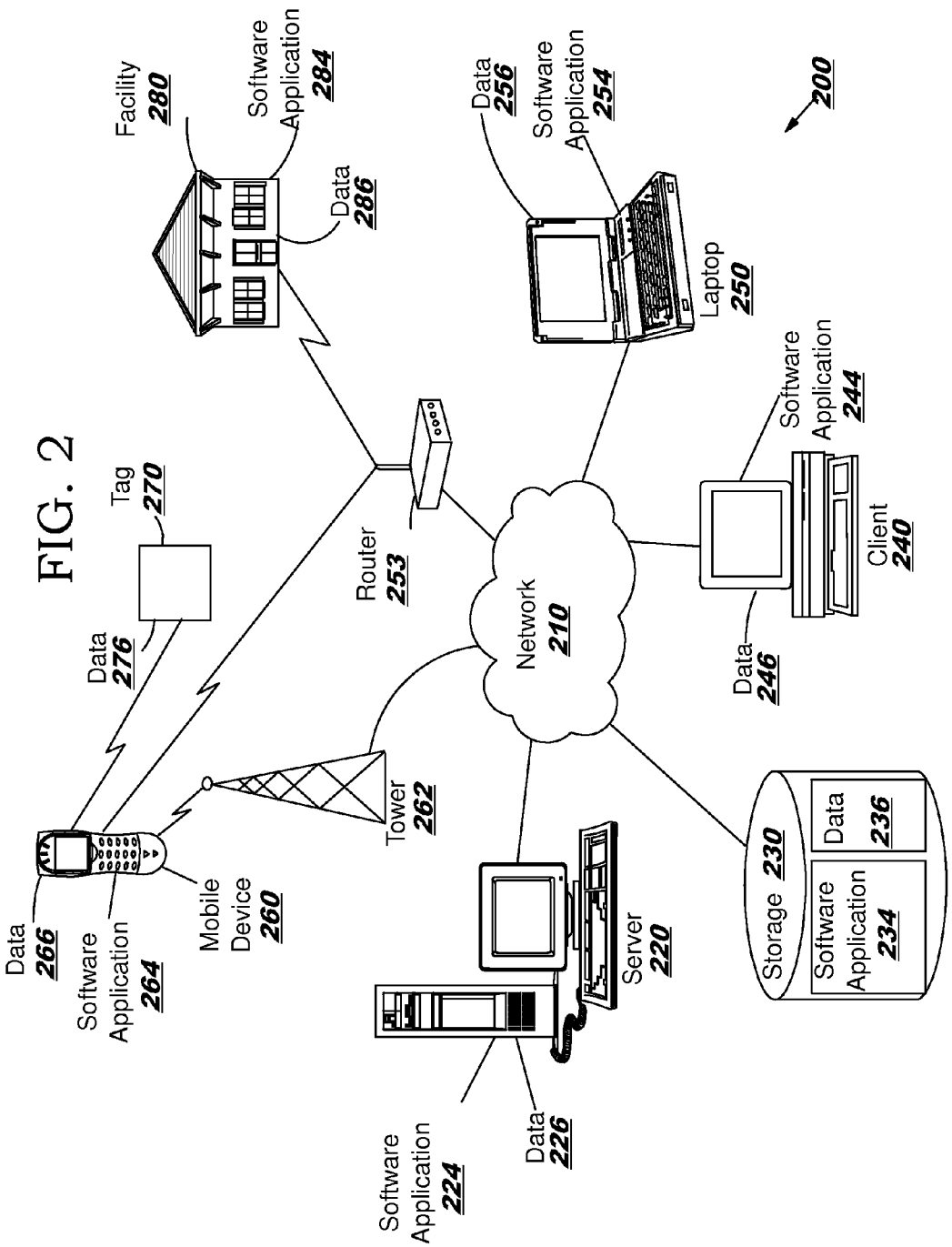
FIG. 2 is a block diagram of an illustrative network of data processing systems in which various embodiments of the present disclosure may be implemented.

FIG. 2 is a block diagram of an illustrative network of data processing systems in which various embodiments of the present disclosure may be implemented. Data processing environment 200 is a network of data processing systems such as described above with reference to FIG. 1. Software applications such as for preventing loss of a mobile device may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220, client 240 and laptop 250 are coupled to network 210 along with storage unit 230. In addition, mobile device 260 and facility 280 (such as a home or business) are coupled to network 210 including wirelessly such as through a network router 253. Mobile device 260 may also be coupled to network 210 through a mobile phone tower 262. Data processing systems, such as server 220, client 240, laptop 250, mobile device 260 and facility 280 contain data and have software applications including software tools executing thereon. Other types of mobile devices such as personal digital assistants (PDAs), smartphones, tablets, netbooks, laptops, etc. may be connected to network 210.

Mobile device 260 may also be wirelessly couple to tag 270 such as through near field communications or other short range communications. Tag 270 may be passive or active. Tag 270 allows mobile device 260 to determine whether the tag is on the proximity of mobile device 260, among other functions. Tag 270 may include data 276 which includes an identifier for distinguishing between multiple tags. Tag 270 may be an RFID (radio frequency identifier) or NFC (near field communications) tag.

Server 220 may include software application 224 and data 226 for preventing loss of a mobile device or other software applications and data in accordance with embodiments described herein. Storage 230 may contain software application 234 and a content source such as data 236 for preventing loss of a mobile device. Other software and content may be stored on storage 230 for sharing among various computer or other data processing devices. Client 240 may include software application 244 and data 246. Laptop 250 and mobile device 260 may also include software applications 254 and 264 and data 256 and 266. Facility 280 may include software applications 284 and data 286. Other types of data processing systems coupled to network 210 may also include software applications. Software applications could include a web browser, email, or other software application for preventing loss of a mobile device.

Server 220, storage unit 230, client 240, laptop 250, mobile device 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile device 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
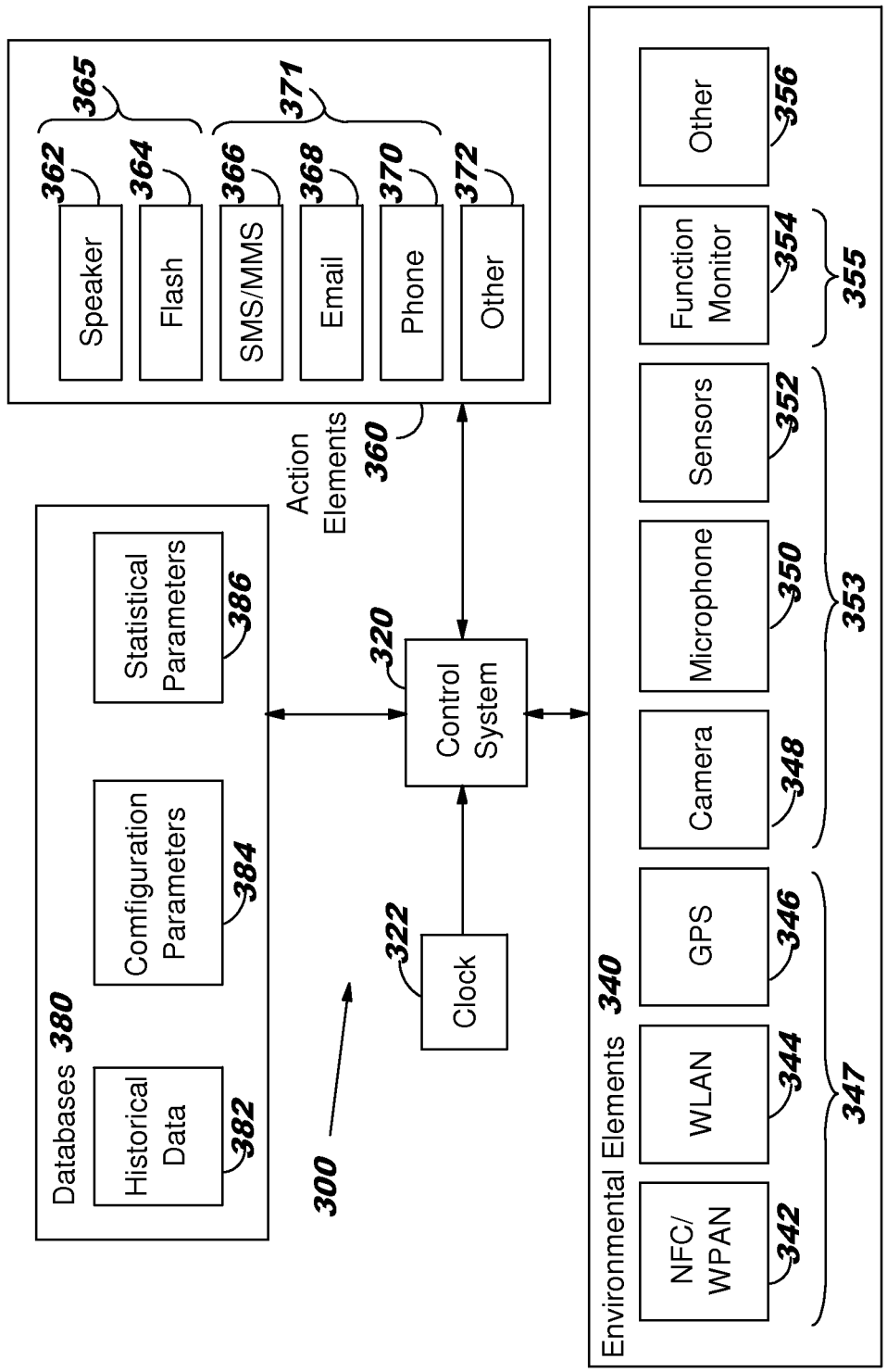
FIG. 3 is a block diagram of a mobile device loss prevention system in which various embodiments may be implemented.

FIG. 3 is a block diagram of a mobile device loss prevention system 300 in which various embodiments may be implemented. The mobile device can be a personal digital assistant (PDA), a smartphone, a tablet, a netbook, a laptop or other type of mobile data processing system.

Mobile device loss prevention system 300 is included in the mobile device to prevent loss of the mobile device. That is, the mobile device loss prevention system may be added to the mobile device as an add-on application or it may be deeply incorporated into the mobile device. The mobile device loss prevention system uses environmental parameters of the mobile device to predict whether the mobile device is lost and then performs certain actions to notify the user or authorized person of the lost prediction. The user or authorized person can then take steps to recover the lost mobile device, thereby preventing loss of the mobile device. This system and process helps prevent loss of the mobile device other than for a temporary time period.

Mobile device loss prevention system includes a control system 320, environmental elements 340, action elements 360 and databases 380. Control system 320 manages the operation of the environmental elements 340, action elements 360 and stores and utilizes information in databases 380. Environmental elements 340 include various elements or devices for determining the environmental conditions of the mobile device. These environmental conditions are sensed and stored as parameters for comparison purposes. Action elements 360 include various elements or devices for notifying the user of the mobile device that the mobile device may have been lost by that user. Environmental elements 340 and action elements 360 may have elements in common. Databases 380 are for storing information utilized to determine whether a change in environmental parameters indicates that the mobile device may be lost.

Control system 320 includes a processor and software or other types of data processing capabilities for carrying out the processes necessary to prevent loss of the mobile device. Control system may be an application running on the mobile device processor or on a separate processor within mobile device loss prevention system 300. Control system includes a clock 322 which can be utilized to time stamp data among other functions.

Environmental elements 340 include NFC/WPAN 342, WLAN 344, GPS 346, camera 348, microphone 350, sensors 352, function monitor 354 and other 356. NFC/WPAN (near field communications/wireless personal area network) 342 includes the capability to communicate with other devices that are either with or in the near proximity of the user. This can include other mobile devices the user may be carrying such as a remote earpiece, a tablet, a tag, or other mobile device. For example, the user may carry a passive tag in his or her wallet for use such as described below. WLAN (wireless local area network) 344 includes the capability to communicate with wireless routers and other devices in the local area. Such communications include identifying information which can be utilized to determine the general location of the mobile device. For example, a home wireless router is easily identified and can be used to determine that the mobile device is not lost. GPS (global positioning system) 346 is able to determine the location of the mobile device anywhere in the world so long as the GPS has a sufficient signal from multiple satellites. If the mobile device is indoors, the GPS function may not function properly. NFC/WPAN 342, WLAN 344 and GPS 346 are location environment detection elements 347 and can all be used for determining the relative or absolute location of the mobile device. Other such locating elements may also be utilized.

Camera 348 can periodically or on demand take a picture of the surrounding of the mobile device. This picture can be analyzed for determining whether familiar objects or persons are nearby. For example, facial recognition technology can be utilized to identify the user or the user's family and friends. Microphone 350 can periodically or on demand sample ambient sounds near the mobile device. This can include when a phone call is being made if the mobile device is a mobile phone. These sounds can be analyzed for determining whether familiar sounds or persons are nearby. For example, voice recognition technology can be utilized to identify the user or the user's family and friends. Sensors 352 can include a variety of other environmental conditions. For example, an accelerometer or other motion sensor may be utilized to determine whether the device is being moved about. An inclinometer may be utilized to determine the orientation or changes in orientation of the mobile device. The accelerometer and inclinometer can also be utilized to identify the current holder of the phone through gait analysis or holding patterns. A thermometer may be utilized to determine the ambient temperature. Camera 348, microphone 350 and sensors 352 are ambient environment sensing elements 353 and can be utilized to determine the ambient conditions of the mobile device. Many other types of sensors may be similarly utilized.

Mobile device function monitor 354 can include monitoring the utilization of the mobile device such as gesturing utilized by a person typing a text, detecting whether the mobile device is being charged, checking calendar entries, etc. Function monitor 354 is a functional environment detection element 355 and can be utilized to determine how the mobile device is being operated by a user. Other environmental elements 356 can include other types of locating elements, sensing elements, etc., such as a sensor detecting battery depletion of the device, that may be utilized to determine environmental parameters useful for determining whether the mobile device may be lost.

Action elements 360 include elements or devices within mobile device loss prevention system 300 for signaling or notifying the user or other persons that the mobile device may be lost. Action elements may include some of the same elements as environmental elements 340. Action elements 360 include speaker 362, flash 364, SMS/MMS 366, Email 368, phone 370 and other action elements 372. Speaker 362 could generate a beep, a voice command, or other audible signal if a determination is made by the mobile device that it may be lost. Flash 364, such as a camera or other light flash, may generate a series of light flashes to alert a nearby person that the mobile device may be lost and to the location of the mobile device. Speaker 362 and flash 364 are vicinity action elements 365 for alerting persons in the vicinity of the mobile device. SMS/MMS (short message service/multimedia message service) 366 can generate a text or other message to a predesignated device to alert the user or other authorized person. Email 368 can generate an email to a predesignated email account to alert the user or other authorized person. Phone 370 can initiated a phone call and phone message to a predesignated phone to alert the user or other authorized person. SMS/MMS 366, email 368 and phone 370 are long range action elements 371 and can alert a user or other authorized person that the mobile device may be lost and to the location of the mobile device. Other action elements 372 can be utilized to alert the user or other authorized person that the mobile device may be lost.

Databases 380 include historical data 382, configuration parameters 384 and statistical parameters 386 for storing information utilized to determine whether a change in environmental parameters indicates that the mobile device may be lost. Historical data 382 includes data collected from environmental elements 340 over an extended period of time sufficient to establish user patterns. Deviation from these patterns can indicate that the mobile device is lost, which can be utilized to perform a set or series of alert actions to notify the user. Configuration parameters 384 include various parameters utilized to configure the mobile device loss prevention system such as a home location, a user voice sample, a threshold deviation from standard patterns, the preferred actions to be taken when the mobile device may have been lost, etc. Statistical parameters 386 include various parameters derived from statistical analysis of historical data such as averages and standard deviations.

Figure 4:
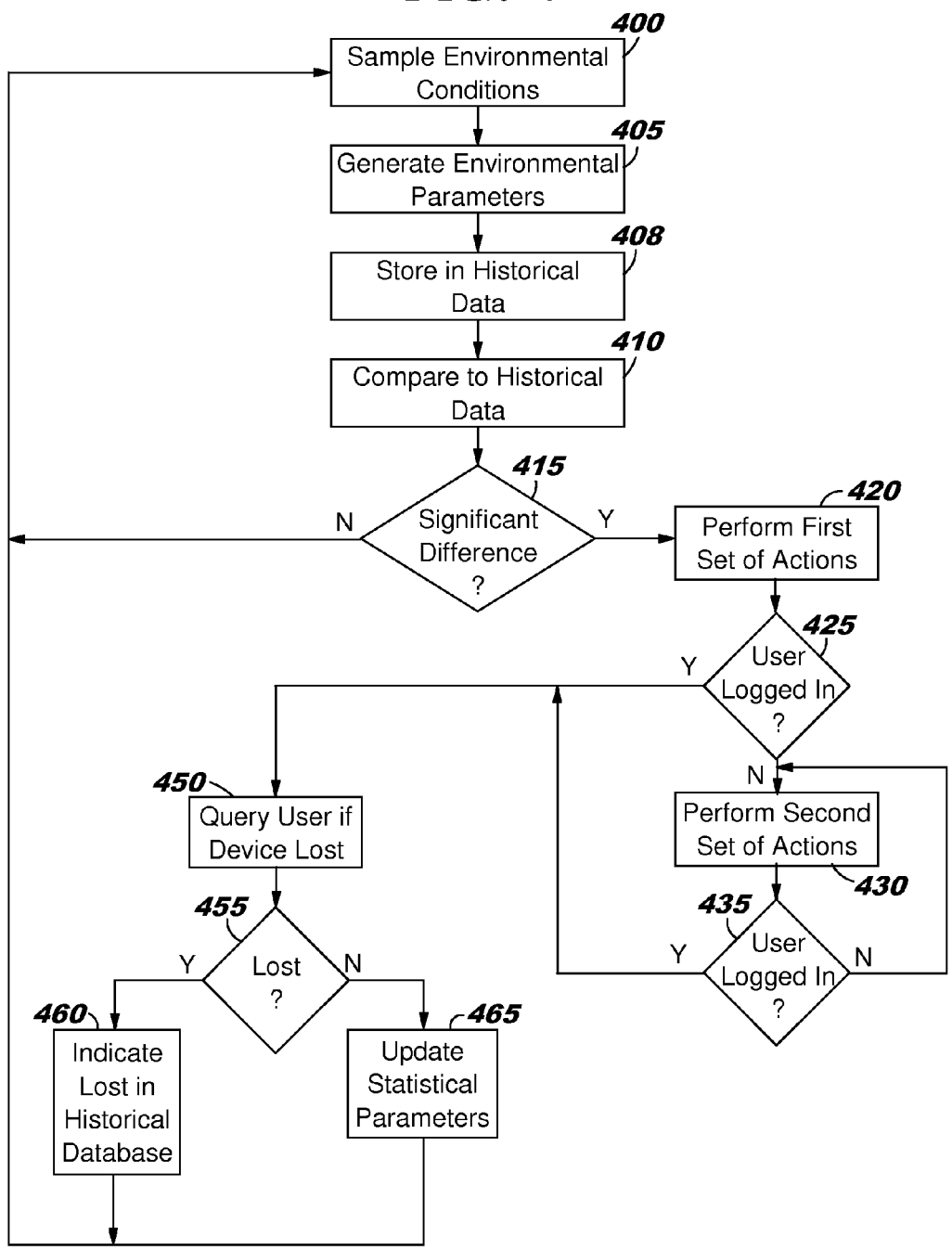
FIG. 4 is a flow diagram of the mobile device loss prevention system in accordance with a first embodiment.

FIG. 4 is a flow diagram of the mobile device loss prevention system in accordance with a first embodiment. In a first step 400, the mobile device loss prevention system samples the environmental conditions of the mobile device. This can include determining the relative or absolute location of the device, determining the ambient conditions, and monitoring the operational functions of the mobile device. Determining the location can include identifying any nearby devices through NFC or WPAN, identifying any routers or other wireless devices through WLAN, or determining the geographic location of the device through GPS. Determining the ambient conditions can include taking a picture, listening to ambient sounds, taking the temperature, determining if the mobile device is being moved, and determining the orientation of the device. Monitoring the operational functions of the phone can include monitoring the user using the mobile device such as user entry onto a touch screen (e.g. text entry, menu selection) and other user activities. Many of the aforementioned actions can be occurring continuously as a monitoring function, but may be sampled periodically or as needed. Such sampling may be different for different environmental conditions.

In a second step 405, the raw sampled data is analyzed and parameters are generated from the analytical results, thereby generating a current set of environmental parameters. These environmental parameters can include absolute or relative measures such as location, probability analysis of whether the current user or holder of the phone is the owner or other authorized person, or other analytical results which can be compared with past analytical results. This current set of environmental parameters is then time stamped and stored in historical data in step 408. The raw data may also be stored with the parameters if desired, although that amount of information may be excessively large for local storage.

In a fourth step 410, the current set of environmental parameters is compared to the historical data. This comparison can include a comparison to averages of historical data (stored in statistical parameters) as well as to specific environmental parameters previously stored in historical data. Then in step 415, a determination is made whether there is a significant difference between the current set of environmental parameters and the historical data. A significant difference is the probability of the device being lost exceeding a threshold. This determination can include statistical analysis of the deviation from the averages as well as determining whether there have been any close matches to specific sets of environmental parameters in the historical data. If there is not a significant difference, then processing returns to step 400, otherwise the mobile device may be lost and processing continues to step 420.

There are many possible examples of potential significant deviations. For a first example, the mobile device lost prevention system may detect unknown voices without detecting known voices in combination with the phone being in an unfamiliar location. That is, the user may have left the phone on a table in a restaurant. For another example, the ambient temperature may be quite low and the phone in an unusual location. This may indicate that the phone is outside and not in the pocket or hand of the user such as if the user dropped the phone while jogging. Each of these examples could create unusual conditions as reflected in the environmental parameters detected by the mobile device loss prevention system.

In step 420, a first set of actions are performed in response to the determination that the mobile device may be lost. This set of actions may be set forth in the configuration database. The mobile device may initially generate and audible sound such as a beep and flash the mobile device light flash to alert the user that the mobile device may be lost. The beeping and flashing can also alert others if someone other than the rightful owner of the phone is taking the phone. This alert can be turned off by the user logging into the mobile device. This prevents an unauthorized person from turning off the alert. The alert may be temporarily suspended by pressing a specific key or button to allow the user time to log into the mobile device. Otherwise, in case of a false positive, the user may be in an environment that continuing the alert could cause discomfort of the user and others. Then in step 425, it is determined whether the user has logged into the mobile device within a predetermined time. If yes, then processing continues to step 450, otherwise processing continues to step 430.

In step 430, a second set of actions are performed in response to the determination that the mobile device may be lost. This set of actions may also be set forth in the configuration database. The mobile device may send a message to another device of the user or other authorized person through one or more communications including text, email or phone call. The message can include information that the mobile device may be lost and include any locational information or other information (such as temperature) which may be useful in locating the mobile device. As before, this alert can be turned off by the user logging into the mobile device. Then in step 435, it is determined whether the user has logged into the mobile device within a predetermined time. If not, then processing returns to step 430 to repeat the message with any updated locational information, otherwise processing continues to step 450.

In step 450, the user has logged into the mobile device, cancelling any alerts. In this step, the user is queried whether the device had been lost. The user response is determined in step 455. If yes, then in step 460 the current set of environmental parameters stored in historical data are marked as indicating a mobile device is lost so that those parameters are not used in the future to indicate a normal set of environmental parameters. If no, then in step 465, the statistical parameters are updated with the current set of environmental parameters to help avoid a similar false positive. Processing then returns to step 400.

Figure 5:
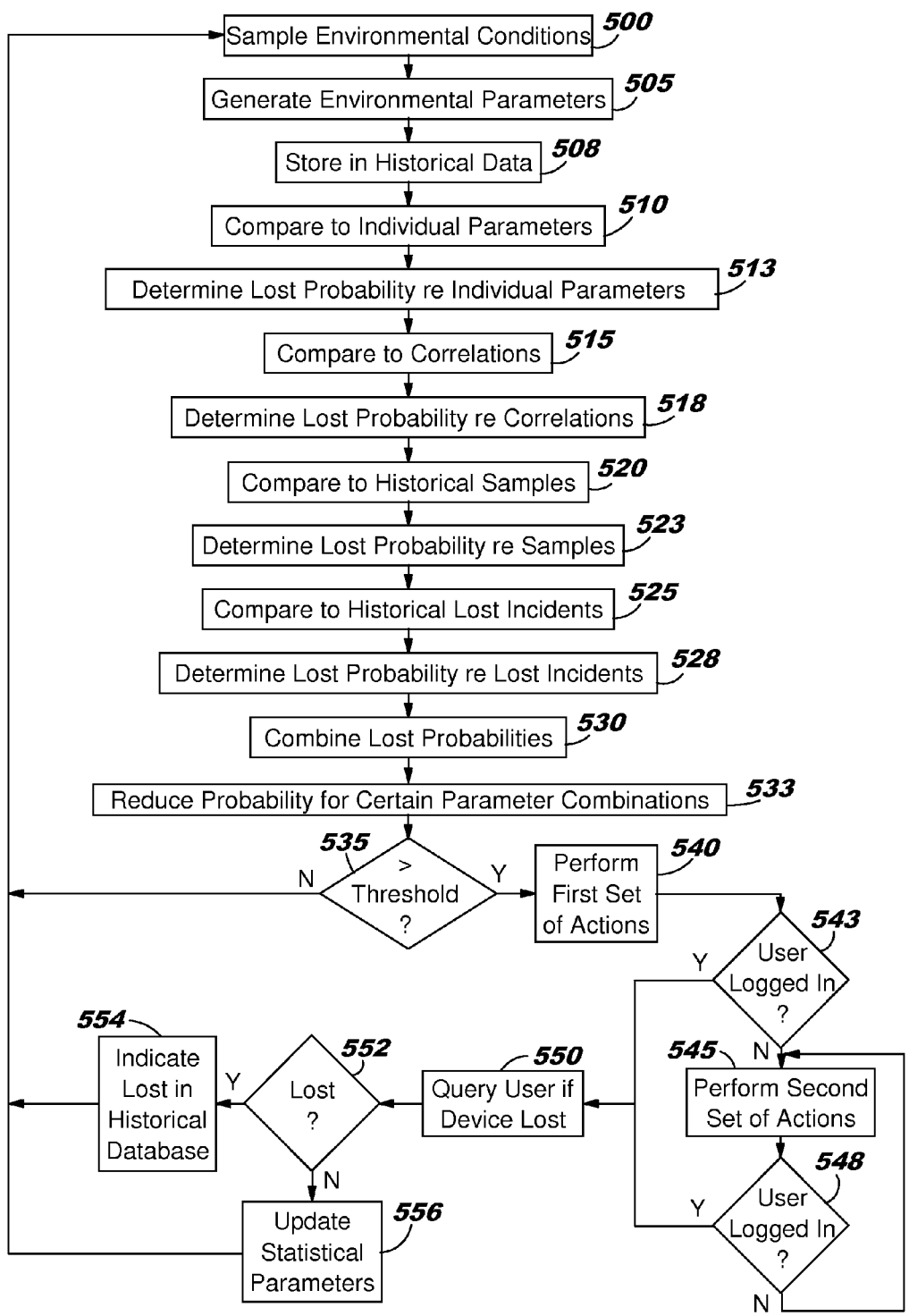
FIG. 5 is a flow diagram of the mobile device loss prevention system in accordance with a second embodiment.

FIG. 5 is a flow diagram of the mobile device loss prevention system in accordance with a second embodiment. In this embodiment, there is greater granularity of statistical analysis and more use of prior data regarding mobile device lost prediction than in the first embodiment. Statistical analysis is the practice or science of collecting and analyzing numerical data in large quantities such as for the purpose of inferring proportions and probabilities in a whole from those in a representative sample.

Due to the lack of initial historical data, the mobile device loss prevention system may initially generate many false positives and false negatives when predicting the mobile device is lost. This can be mitigated by the use of dummy statistical data initially, which can then be supplanted with actual historical data over time. This dummy statistical data can be developed based on actual data of other users or with artificial data. The user may be queried about his or her activities when acquiring the mobile device to tailor the dummy data to the user.

In a first step 500, the mobile device loss prevention system samples the environmental conditions of the mobile device. This can include determining the relative or absolute location of the device, determining the ambient conditions, and monitoring the operational functions of the mobile device. Determining the location can include identifying any nearby devices through NFC or WPAN, identifying any routers or other wireless devices through WLAN, or determining the geographic location of the device through GPS. Determining the ambient conditions can include taking a picture, listening to ambient sounds, taking the temperature, determining if the mobile device is being moved, and determining the orientation of the device. Monitoring the operational functions of the phone can include monitoring the user using the mobile device such as user entry onto a touch screen (e.g. text entry, menu selection) and other user activities. Many of the aforementioned actions can be occurring continuously as a monitoring function, but may be sampled periodically or as needed. Such sampling may be different for different environmental conditions.

In a second step 505, the raw sampled data is analyzed and parameters are generated from the analytical results, thereby generating a current set of environmental parameters. These environmental parameters can include absolute or relative measures such as location, probability analysis of whether the current user or holder of the phone is the owner or other authorized person, or other analytical results which can be compared with past analytical results. This current set of environmental parameters is then time stamped and stored in historical data in step 508. The raw data may also be stored with the parameters if desired, although that amount of information may be excessively large for local storage.

In a fourth step 510, the current set of environmental parameters is compared to statistical parameters derived from historical data for each type of environmental parameter detected to determine deviations from the norm. The statistical parameters can include averages with standard deviations, probabilities based on prior historical data, and other statistical measures which can be compared with the current environmental parameters. A probability that the mobile device is lost is based on these individual environmental parameter deviations is then generated in step 513.

Then in step 515, the current set of environmental parameters is compared to detected correlations developed from historical data to determine deviations from the norm. For example, historical data may demonstrate a significant correlation between ambient temperature and motion. That is, whenever the mobile device is outside in cooler or warmer temperatures, the user is moving such as by exercising. These correlations may also be time sensitive. That is, the correlation described above may occur in the morning, but not the evening. A probability that the mobile device is lost is based on environmental parameter deviations from these correlations is then generated in step 518.

In step 520, the current set of environmental parameters is compared to prior historical samples stored in historical data to determine how many times which there have been similar environmental parameters. From this information, such as a percentage of samples that are similar (or not), a statistical probability that the mobile device is lost can be determined based on this similarity sample information in step 523.

In step 525, the current step of environmental parameters is compared to prior historical incidents stored in historical data where the mobile device was lost, as confirmed by the user, to determine how many times which there have been similar environmental parameters. This information can then be used to determine a statistical probability that the mobile device is lost is based on similarity with prior lost environmental parameters in step 528.

Then in step 530, the above described probabilities that the mobile device is lost are weighted and combined to generate an overall probability that the mobile device is lost. Other forms of combining probabilities can be utilized including weighting the probabilities based on statistical confidence in each individual probability. Then in step 533, the lost probability is reduced if certain parameter conditions are identified. For example, if the device is plugged in and a known voice is heard, then the probability may be reduced based on prior knowledge or other information beyond the historical samples. For another example, if the calendaring function of the mobile device indicates a change in location, then more movement than normal may be expected.

Once the final probability that the mobile device is lost has been determined, then in step 535 an overall determination is made whether there is a significant difference between the current set of environmental parameters and the historical data (including statistical data derived from that historical data). A significant difference is indicated by the probability of the device being lost exceeding a threshold. The threshold can include statistical confidence levels such that certain confidence levels of a given lost probability are needed to exceed the threshold. If there is not a significant difference, then processing returns to step 500, otherwise the mobile device may be lost and processing continues to step 540.

There are many possible examples of potential significant deviations. For a first example, the mobile device lost prevention system may detect unknown voices without detecting known voices in combination with the phone being in an unfamiliar location. That is, the user may have left the phone on a table in a restaurant. For another example, the ambient temperature may be quite low and the phone in an unusual location. This may indicate that the phone is outside and not in the pocket or hand of the user such as if the user dropped the phone while jogging. Each of these examples could create unusual conditions as reflected in the environmental parameters detected by the mobile device loss prevention system.

In step 540, a first set of actions are performed in response to the determination that the mobile device may be lost. This set of actions may be set forth in the configuration database. The mobile device may initially generate and audible sound such as a beep and flash the mobile device light flash to alert the user that the mobile device may be lost. The beeping and flashing can also alert others if someone other than the rightful owner of the phone is taking the phone. This alert can be turned off by the user logging into the mobile device. This prevents an unauthorized person from turning off the alert. The alert may be temporarily suspended by pressing a specific key or button to allow the user time to log into the mobile device. Otherwise, in case of a false positive, the user may be in an environment that continuing the alert could cause discomfort of the user and others. Then in step 543, it is determined whether the user has logged into the mobile device within a predetermined time. If yes, then processing continues to step 550, otherwise processing continues to step 545.

In step 545, a second set of actions are performed in response to the determination that the mobile device may be lost. This set of actions may also be set forth in the configuration database. The mobile device may send a message to another device of the user or other authorized person through one or more communications including text, email or phone call. The message can include information that the mobile device may be lost and include any locational information or other information (such as temperature, pictures of the surroundings, name of closest WLAN, etc.) which may be useful in locating the mobile device. The GPS unit may be turned on to determine the geographic location of the mobile device. Other actions can be taken to maximize the probability of notifying the owner or other authorized person of the location of the mobile device including sending logs of the handler's activities with the phone. As before, this alert can be turned off by the user logging into the mobile device. Then in step 548, it is determined whether the user has logged into the mobile device within a predetermined time. If not, then processing returns to step 545 to repeat the message with any updated locational information, otherwise processing continues to step 550. The first and second set of actions may be configurable by the user. For example, the first set of actions may not be performed or may be performed more vigorously depending on the configuration or the circumstances. For another example, if it is apparent that the mobile device has just been absconded, then the beeping and flashing may be at maximum intensity and for a long duration without allowing the handler to suspend the alert. Furthermore, the second set of actions may be performed concurrently with the first set of actions.

In step 550, the user has logged into the mobile device, cancelling any alerts. In this step, the user is queried whether the device had been lost. The user response is determined in step 552. If yes, then in step 554 the current set of environmental parameters stored in historical data are marked as indicating a mobile device is lost so that those parameters are not used in the future to indicate a normal set of environmental parameters. If no, then in step 556, the statistical parameters are updated with the current set of environmental parameters to help avoid a similar false positive. Processing then returns to step 500.

Many other configurations may be implemented in alternative embodiments. For example, the historical data may be periodically uploaded to a central server for performing detailed statistical analysis for determining the statistical parameters and perhaps modifying the configuration parameters. This provides for a more distributed system of processing environmental parameters.

FIG. 6A through 6C are block diagrams of types of database records in which various embodiments may be implemented. A record is a set of information within a domain or database that establishes a relationship between a set of data or data elements. A record may be a separate entry into a database, a set of links between data, or other logical relationship between a set of data.

FIG. 6A is a block diagram of a record 600 stored in a historical data database. There is a single record for each recorded set of environmental parameters for a mobile device environmental condition sample, although alternative embodiments may differ. Raw data is not stored in this database, although alternative embodiments may do so. All parameters stored in this database are considered environmental parameters, although they are categorized by type as describe herein. Each set of parameters described below may contain more than one parameter.

Each record 600 includes a timestamp 601, location parameters 602, ambient parameters 603, operational functionality parameters 604, derivative parameters 605, other parameters 606, and a lost flag 607 indicating whether the sampled environment was an actual mobile device lost as confirmed by the user. Timestamp 601 is the time the particular sample was taken to generate the parameters. Location parameters 602 include a set of parameters regarding the relative or absolute location of the mobile device. Ambient parameters 603 include a set of parameters describing the ambient conditions of the mobile device such as temperature and motion. Operational functionality parameters 604 include a set of parameters regarding the functionality of the mobile device such as typing speed or angle of finger placement of the user on the mobile device. Derivative parameters 605 include a set of parameters which may be derived from the foregoing sets of parameters. For example, based on several parameters, a predictive value can be made of whether the holder of the mobile device is the user. Other parameters 606 include a set of environmental parameters other than described above. Lost flag 607 is a flag generated when the user confirms that this particular sample corresponds to conditions when the mobile device was lost.

FIG. 6B is a block diagram of a record 620 stored in a configuration parameters database. Record 620 includes a variety of information utilized to configure the operation of the mobile device loss prevention system. Each of the below described elements may include multiple sets of information utilized to configure the loss prevention system. Record 620 includes user information 621, authorized person information 622, location information 623, other device information 624, lost probability weighting 625, probability reduction parameters 626, threshold probability 627, first actions 628 and second actions 629.

User information 621 provides a variety of information regarding the user including name, contact information, facial recognition parameters, voice recognition parameters, gesturing parameters, etc. This information can be utilized to recognize the user as well as contact the user if the mobile device is possibly lost. Authorized person information 622 includes similar information to user information 621 for similar purposes. For example, a spouse of the user may be an authorized person. Location information 623 includes information regarding known locations such as the user's home, place of work, WLAN devices at those locations, frequented other location information, etc. This information may be utilized to determine whether the mobile device is in a known location or an unknown location. This information may also be utilized to provide information the user or authorized person of the location of the mobile device. Other device information 624 includes information regarding other devices normally utilized by the user including an earpiece, a tag, a tablet or mobile phone, etc.

Lost probability weighting 625 includes the weighting utilized to determine an overall probability of use or the algorithm utilized to determine a weighting. Probability reduction parameters 626 include certain non-historical parameters or combinations of parameters that indicate that the device is not lost or indicate that it is lost. Threshold probability 627 includes a threshold utilized to determine whether the determined probability that the mobile device is lost is sufficient to take action to contact and notify the user or authorized person of the lost prediction. First actions 628 includes the actions taken when it is determined that the mobile device is lost. Second actions 629 includes the actions taken when it is determined that the mobile device is lost. Alternative embodiments may utilize different configuration parameters. In addition, many other types of configuration parameters may be utilized and stored in this database.

FIG. 6C is a block diagram of records 640 and 660 stored in a statistical parameters database. Records 640 and 660 include information useful for performing statistical analysis to determine whether the mobile device is lost. This statistical information is generally derived from the historical data. There are two types of records shown in the statistical parameters database. The first record 640 is used for storing information regarding different sampled environmental parameters used for statistical analysis. For example, there may be a record for all samples of temperature and another record for all samples of location. Record 640 includes sample parameter description 641, sample parameter distribution type 642, sample parameter average 643, sample parameter standard deviation 644 and sample parameter number 645. The second record 660 is used for storing information regarding different correlations used for statistical analysis. Record 660 includes correlation type 661, correlation distribution 662, correlation average 663, correlation standard deviation 664, and correlation number 665.

Sample parameter description 641 includes a description of the parameter sample. For example, it could include the term temperature if samples of the temperature are statistically described in this record. Sample parameter distribution type 642 includes the type of distribution of the parameter sampled. For example, the result of the sampling may generate a normal curve, a uniform distribution, a bimodal normal distribution, a Poisson distribution, etc. The remaining elements of the record may vary depending on the distribution, but are described as if the sample distribution is a normal distribution. Sample parameter average 643 includes the average of all the samples of the parameter. Sample parameter standard deviation 644 includes the standard deviation of all the samples of the parameter. Sample parameter number 645 includes the number of samples used to generate the average and standard deviation. This number is important in providing a confidence level in any predicted lost probability.

Correlation type 661 includes a description of the type correlation provided. For example, the correlation may be between temperature and location. Correlation distribution 662 includes the type of distribution of the parameter sampled. For example, the result of the sampling may generate a normal curve, a uniform distribution, a bimodal normal distribution, a Poisson distribution, etc. The remaining elements of the record may vary depending on the distribution, but are described as if the sample distribution is a normal distribution. Correlation average 663 includes the average of all the samples of the correlation. Correlation standard deviation 664 includes the standard deviation of all the samples of the correlation. Correlation number 665 includes the number of samples used to generate the average and standard deviation. This number is important in providing a confidence level in any predicted lost probability.

The type of information stored in each of the above described databases can vary significantly depending on the type of environmental parameters sampled, the configuration of the loss prevention system, and the statistical analysis performed. Many other types of information can be gathered and utilized for predicting whether the mobile device may be lost.

The invention can take the form of an entirely software embodiment, or an embodiment containing both hardware and software elements. In a preferred embodiment, the embodiments are implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer usable medium(s) having computer usable program code embodied thereon.

Any combination of one or more computer usable medium(s) may be utilized. The computer usable medium may be a computer usable signal medium or a non-transitory computer usable storage medium. A computer usable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer usable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer usable storage medium may be any tangible medium that can contain, or store a program for use by or in connection with an instruction execution system, apparatus, or device.

A computer usable signal medium may include a propagated data signal with computer usable program code embodied therein, for example, in baseband or as part of a carrier wave. Such a propagated signal may take any of a variety of forms, including, but not limited to, electromagnetic, optical, or any suitable combination thereof. A computer usable signal medium may be a computer usable medium that is not a computer usable storage medium and that can communicate, propagate, or transport a program for use by or in connection with an instruction execution system, apparatus, or device.

Program code embodied on a computer usable medium may be transmitted using any appropriate medium, including but not limited to wireless, wireline, optical fiber cable, RF, etc., or any suitable combination of the foregoing. Further, a computer storage medium may contain or store a computer-usable program code such that when the computer-usable program code is executed on a computer, the execution of this computer-usable program code causes the computer to transmit another computer-usable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for preventing loss of a mobile device. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a mobile device to prevent loss comprising:
    monitoring environmental parameters by the mobile device including location and ambient conditions to determine a general location of the mobile device and to determine whether any person in proximity of the mobile device is authorized:
    storing the environmental parameters, including location and ambient conditions to determine the general location of the mobile device and to determine whether any person in proximity of the mobile device is authorized, to form a history of the environmental parameters;
    applying statistical analysis to a current set of environmental parameters monitored by the mobile device, including the location and ambient conditions to determine the general location of the mobile device and to determine whether any person in proximity of the mobile device is authorized based on the environmental parameters, as compared to the history of the environmental parameters to determine a probability that the mobile device is lost;
    wherein the statistical analysis applied to the current set of environmental parameters includes correlations between a plurality of environmental parameters including a correlation between the general location of the mobile device and whether an authorized person is in proximity of the mobile device to determine a probability that the mobile device is lost; and
    responsive to determining the probability that the mobile device is lost exceeds a threshold, performing an action to prevent loss of the mobile device.

2. The method of claim 1 wherein the environmental parameters monitored and applied to statistical analysis include operational functions performed by the user operating the mobile device to determine whether the user is an authorized person.

3. The method of claim 2 wherein the environmental parameters are selected from a group consisting of geographic location, temperature, device motion, device orientation, image capture analysis, audio capture analysis, battery depletion of the device, and analysis of the operational functionality of the device.

4. The method of claim 3 further comprising:
generating statistical derivatives of the history of environmental parameters;
wherein applying statistical analysis to a current set of environmental parameters as compared to the history of the environmental parameters includes applying statistical analysis to statistical derivatives of the history of the environmental parameters;
wherein the statistical analysis applied to the environmental parameters includes correlations between a plurality of environmental parameters including the general location of the mobile device and the ambient conditions to determine a probability that the mobile device is lost;
wherein the action is selected from a group consisting of an audible alert, flashing a light, texting information to another device, emailing information to another device, and phoning information to another device; and
wherein the mobile device is selected from a group consisting of a personal digital assistant (PDA), a smartphone, a tablet, a netbook and a laptop.

5. The method of claim 2 further comprising:
generating statistical derivatives of the history of environmental parameters;
wherein applying statistical analysis to a current set of environmental parameters as compared to the history of the environmental parameters includes applying statistical analysis to statistical derivatives of the history of the environmental parameters.

6. The method of claim 2 wherein the correlations between the plurality of environmental parameters includes detecting unknown voices without detecting known authorized voices in combination with the mobile being in an unfamiliar location to determine a probability that the mobile device is lost.

7. The method of claim 6 wherein the correlations between the plurality of environmental parameters includes operational functions performed on the device.

8. The method of claim 1 wherein the action is selected from a group consisting of an audible alert, flashing a light, texting information to another device, emailing information to another device, and phoning information to another device.

9. The method of claim 1 wherein the mobile device is selected from a group consisting of a personal digital assistant (PDA), a smartphone, a tablet, a netbook and a laptop.

10. The method of claim 1 wherein the ambient conditions are selected from a group consisting of sound, camera input and temperature.

11. The method of claim 10 wherein the location and ambient conditions are sensed by mobile device sensors selected from the group of microphone, camera, thermometer, accelerometer, and inclinometer.

12. The method of claim 1 further comprising determining whether a passive tag carried by the authorized person is no longer within proximity of the mobile device wherein the passive tag determination is utilized to determine whether the authorized person is in proximity of the mobile device.

13. A method for a mobile device to prevent loss comprising:
monitoring environmental parameters by the mobile device including a general location of the mobile device, whether any person in proximity of the mobile device is authorized, and operational functions performed by the user operating the mobile device to determine whether the user is the authorized person;
storing the environmental parameters including the general location of the mobile device, whether any person in proximity of the mobile device is authorized, and operational functions performed by the user operating the mobile device to form a history of the environmental parameters;
applying statistical analysis to a current set of environmental parameters including the general location, whether any person in the proximity of the mobile device is authorized based on the environmental parameters, and operational functions monitored by the mobile device including a correlation between the general location of the mobile device, whether any person in proximity of the mobile device is authorized and operational functions performed by the user operating the mobile device as compared to the history of the environmental parameters to determine a probability that the mobile device is lost; and
responsive to determining the probability that the mobile device is lost exceeds a threshold, performing an action to prevent loss of the mobile device.

* * * * *